United States Patent [19]

Un et al.

[11] Patent Number: 4,701,905

[45] Date of Patent: Oct. 20, 1987

[54] LOCAL AREA NETWORK SYSTEM UTILIZIING A CODE DIVISION MULTIPLE ACCESS METHOD

[75] Inventors: Chong K. Un, Seoul; Seung M. Ryu, Chungnam; Chong R. Lee, Seoul, all of Rep. of Korea

[73] Assignee: Korean Advanced Institute of Science and Technology, Rep. of Korea

[21] Appl. No.: 801,720

[22] Filed: Nov. 26, 1985

[30] Foreign Application Priority Data

Nov. 26, 1984 [KR] Rep. of Korea ............... 7479/84

[51] Int. Cl.$^4$ .............................................. H04J 13/00
[52] U.S. Cl. ....................................... 370/18; 375/96; 364/728
[58] Field of Search ................... 370/18, 19, 100, 102, 370/108, 85; 375/3, 106, 109, 25, 38, 96; 364/728, 819, 826

[56] References Cited

U.S. PATENT DOCUMENTS

| | | | |
|---|---|---|---|
| 3,752,921 | 8/1973 | Audretsch, Jr. et al. | 370/109 |
| 3,885,105 | 5/1975 | Hildenbrand | 370/19 |
| 4,301,530 | 11/1981 | Gutleber | 370/19 |
| 4,392,220 | 7/1983 | Hirosaki et al. | 370/19 |
| 4,475,214 | 10/1984 | Gutleber | 370/18 |
| 4,475,215 | 10/1984 | Gutleber | 370/18 |
| 4,494,228 | 1/1985 | Gutleber | 370/18 |
| 4,542,515 | 9/1985 | Gutleber | 370/18 |

Primary Examiner—Robert L. Griffin
Assistant Examiner—Stephen Chin
Attorney, Agent, or Firm—Beveridge, De Grandi & Weilacher

[57] ABSTRACT

A local area network system using a code division multiple access method is provided. The system includes a repeater for generating a reference synchronizing signal to synchronize the system, transceivers, connected to the repeater via a sending line and a receiving line, and subscriber units, connected to each transceiver. Each transceiver includes a common synchronizing circuit section for replicating and regenerating a synchronizing signal, as a reference signal, which is equal to the reference synchronizing signal generated by the repeater. Each transceiver also has a transmitter for delaying the synchronizing signal in accordance with the specific number of each subscriber unit and the delay time attributed to the sending and the receiving lines, multiplying the delayed synchronizing signal by the signal obtained by level coding the data sent by the transmitter into M-ary data, and then transmitting multiplied data to the sending line. Moreover, the transceiver has a receiver for delaying a reference synchronizing signal which is generated at the common synchronizing circuit section with the delay time corresponding to the specific number of the receiver, detecting the sent signal which corresponds to the subscriber units of the receiver after providing a correlation value in accordance with the delayed synchronizing signal, and converting the sent signal into original data by integrating the detected signal. Therefore, the users may simultaneously transmit their data over the same transmission lines without collision among their data. Also they may exchange information with each other without a central switchboard.

1 Claim, 5 Drawing Figures

LOCAL AREA NETWORK SYSTEM UTILIZIING A CODE DIVISION MULTIPLE ACCESS METHOD

BACKGROUND OF THE INVENTION

1. Field of The Invention

The present invention relates to a local area network system utilizing a code division multiple access technique. More particularly, it is concerned with a local area network system in which a communication network between all users can be fabricated without the installation of a central switchboard. The invention makes it possible for information to be transmitted among all users at any time, by applying the code division multiple access technique and also to switch the communication path transmitting a variety of voice and data on the same transmission line by means of a distributed control method.

2. Description of the Prior Art

Owing to the development of computers and communication techniques, local area network systems have been developed which are capable of transmitting voice signals as well as data over a limited distance. These systems are in use for communication between the respective users who are segregated in a building or a limited area. Such conventional local area networks have usually adopted the time division multiple access network technique. Therefore, unless a time margin width between each signal from users is not established, a plurality of users are unable to transmit their signals simultaneously on the same transmission line without colliding with the signals between other users. In such case, the time margin width between the signals from each user must be defined in order to avoid the collision with signals between users. As a result, the conventional networks are disadvantageously unable to maintain certain transmission performance criteria satisfactorily.

Code division multiple access systems have been used in the communications filed. Owing to their cost and complexity; however, such systems have been used primarily for military applications and the like. Use of such systems in the general communications field has heretofor been quite limited.

SUMMARY OF THE INVENTION

It is therefore the object of the invention to develop a new type of local area network employing code division multiple access method in which the disadvantages of the existing local network systems are eliminated.

The present invention provides a code division multiple access local area network system which is inexpensive to manufacture and provides superior transmission performance over a large network area. These results are achieved in part owing to the known transmission channel characteristics, user placement and the like.

BRIEF DESCRIPTION OF THE DRAWINGS

The above and other objects, and advantages of the present invention will become more apparent from the detailed description hereunder taken in connection with the accompanying drawings, wherein.

DESCRIPTION OF THE PREFERRED EMBODIMENTS

Figure 1:
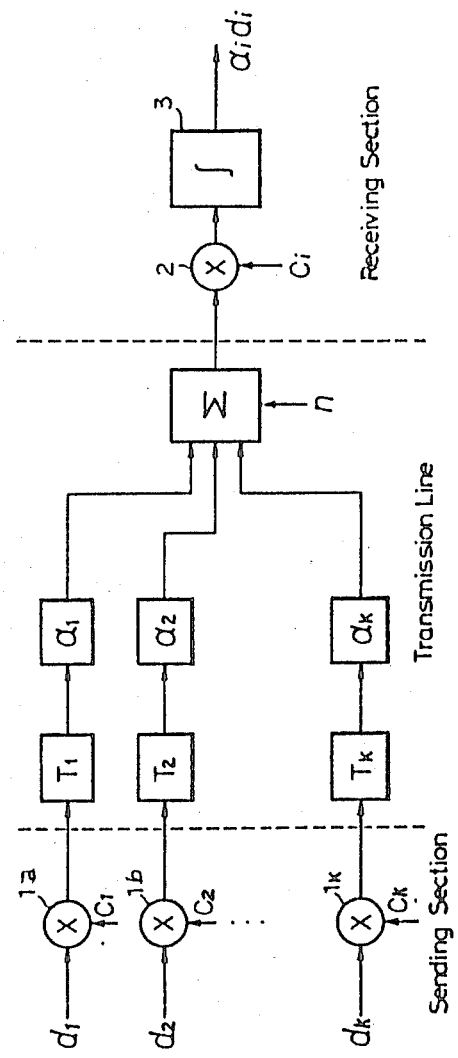
FIG. 1 is a schematic representation of a conventional code division multiple access method.

As illustrated in FIG. 1, a code division multiple access method is a communication system in which data (d1, d2 . . . , dk) to be transmitted by all users are multiplied by code sequences (c1, c2 . . . , ck) which are orthogonal to each other, using multipliers (1a, 1b, . . . , 1k) (wherein, the data and the code sequences are both binary and express bipolarity according to different signs of data), and the resulting signal is sent through the transmission line. Each output signal which has thus been sent through the the transmission line is delayed by a desired period of time (T1, T2, . . . , Tk), adjusted to a predetermined amplitude ($\alpha$1, $\alpha$2, . . . , $\alpha$k), and then transmitted to a receiving section with noise being added. The signals which have thus been sent to the receiving section are multiplied by a specific code sequence (c1) at a multiplier (2), and then integrated at an integrator (3). Consequently, undesired signals which are orthogonal to each other are not output. Only the desired signals are output.

Figure 2:
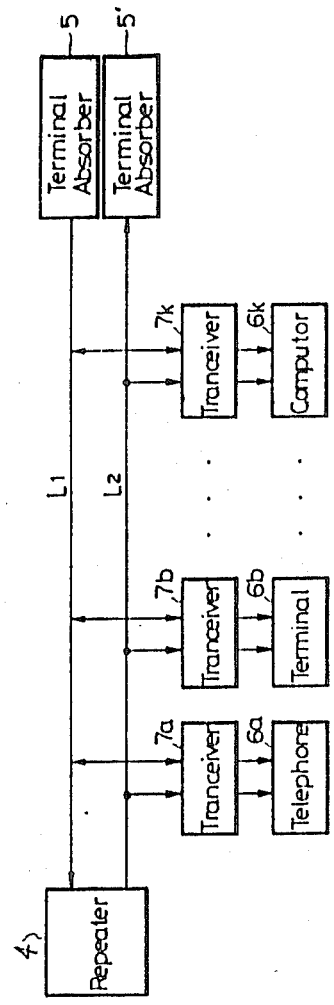
FIG. 2 is a schematic diagram of a local area network system according to the present invention utilizing a code division multiple access method.

The local area network of the present invention utilizes the above kind of code division communication method. As seen in FIG. 2, the local area network comprises a transmission sending line (L1) and a receiving line (L2) (hereinafter, referred to as transmission lines, collectively) which are connected to each other via a repeater (4). Terminators (5) and (5') are connected to the other end of the transmission lines (L1) and (L2) to absorb the residual signals. Subscriber units (6a, 6b, . . . , 6k) including telephones, terminals, computers and the like, are connected to the sending line (L1) and the receiving line (L2) via transceivers (7a, 7b, . . . , 7k). In FIG. 2, the repeater (4) continuously transmits one of the orthogonal codes to the receiving line (L2) as a reference signal in order to synchronize the entire communication network. Each of the subscriber units (6a, 6b, . . . , 6k) establishes synchronization in accordance with the reference signal corresponding to the specific code sequence allocated to such subscriber to send it to the sending line (L1). When the signals are sent, the delay and the amplitude of the signals are appropriately adjusted in advance at the transceivers (7a, 7b, . . . , 7c), taking into account the delay and attenuation due to the transmission lines (L1) and (L2), so that all the signals sent from each of the subscriber units can be synchronized with the same amplitude regardless of the location of such unit.

As described above, since the characteristics of the communication network in accordance with the present invention depend upon those of the orthogonal code sequence used, the number of users that can use the network is limited by the type of the code sequence. Also, the better the orthogonality between the code sequence is, the better the communication.

Figure 3:
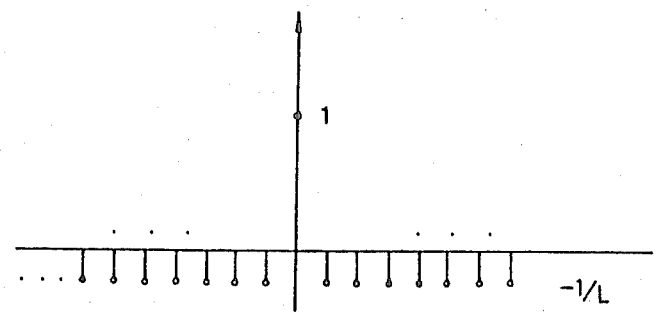
FIG. 3 is a diagram depicting the autocorrelation value of the maximal-length code sequence in accordance with the invention.

The communication network of the present invention can achieve the desired orthogonal characteristics by adopting a maximal-length code sequence as the reference signal and adopting bit-shifted maximal-length codes as different codes. In other words, only when the synchronization is in coincidence, as shown in FIG. 3, the autocorrelation value of the maximal-length code sequence becomes "1", and when the synchronism deviates by one or more bits, the value always becomes "$-1/L$" (wherein, L is the number of bits per period). Therefore, if a code sequence is sufficiently long, the crosscorrelation value between the maximal-length code sequences that deviate by one or more bits, becomes almost "0" and, thus, the desired orthogonal characteristics are achieved. However, it is required that synchronization between the code sequences used be perfect. This is accomplished by the reference signal transmitted from the repeater (4).

Consequently, each of the subscriber units (6a, 6b, . . . , 6k) is synchronized with the reference signal of the repeater (4). Further, as the number of subscribers is determined by the number of bits delayed from the reference signal, the number of the subscribers that can use the present communication network depends upon the period of the maximal-length code sequences.

Figure 4:
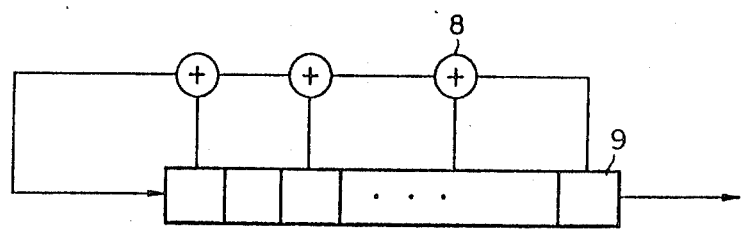
FIG. 4 is a block diagram illustrating the maximal-length code generator accordance with the invention.

The maximal-length code sequences, as shown in FIG. 4, can be generated simply by a device which is composed of a series of operating elements (8) and a shift register (9). When the data are modulated by the orthogonal code sequences and then transmitted, it is possible to break the orthogonal relationship between the code sequences. Thus, the performance of the communication network is significantly affected by whether a suitable modulation system is used. Thus, the length of one data bit to be transmitted should be integral times that of a code sequence in order to ensure the orthogonality between the code sequences used and thereby to achieve the desired high quality of transmission. To make the transmission speed as high as possible, the length of one data bit is usually selected such that it can be equal to that of a code sequence. Further, in order to prevent the orthogonality from being degraded by data, the time required for sending the data by each subscriber unit is regulated so that the modulated code sequence is always in synchronism at the input end of the repeater. That is, each modulated code sequence should be transmitted with compensation for the delay time.

Thus, since the limit of the data transmission speed is determined by the length of the code sequence, a short code sequence is more advantageous. However, in such a case, as mentioned above, the number of the subscriber units (6a, 6b, . . . , 6k) would be reduced. Therefore, it is necessary for the length of a code sequence to be chosen which balance these considerations. In addition, data can be sent more rapidly than the normal data transmission speed, if the amplitude of the signal to be transmitted is divided into multiple levels by amplitude modulation. That is, it is possible to send the data more rapidly if the data to be transmitted are not sent in an M-ary form than a binary form.

Figure 5:
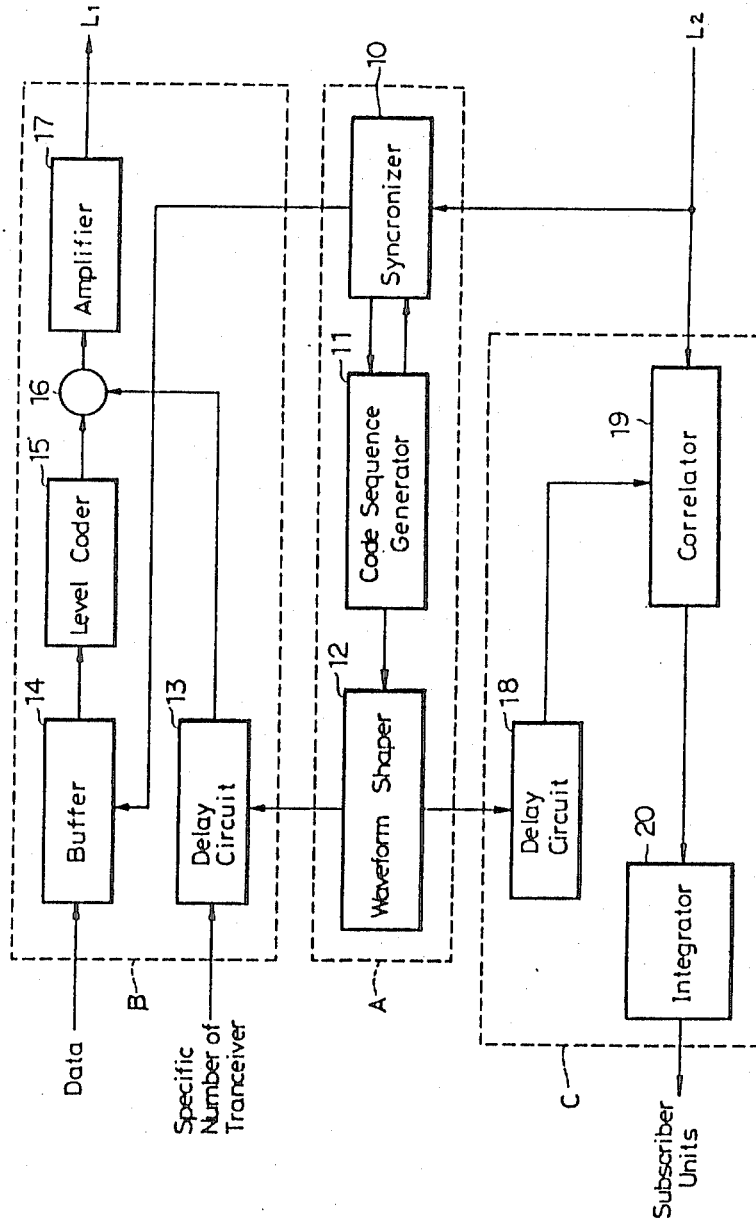
FIG. 5 is a detailed schematic representation of a transceiver in accordance with the invention.

Referring to FIG. 5, which represents a detailed block diagram of the transceiver (7a, 7b, . . . , 7k) shown in FIG. 2, each of the transceivers comprises a shared synchronizing circuit section (A), a transmitter (B) and a receiver (C), the latter two being connected to the common synchronizing circuit section (A). The common synchronizing circuit section (A) comprises a synchronizer (10) for generating a synchronizing signal in accordance with the reference signal from a repeater (4), a code sequence generator (11) for producing the code sequence in accordance with a synchronizing signal from the synchronizer (10), and a waveform shaper (12) for waveshaping the code sequence signal from the code sequence generator (11). The transmitter (B) comprises a delay circuit (13) for delaying the output signal from the waveform shaper (12) according to the specific number of the transceiver, a buffer (14) for buffering data in accordance with a synchronizing signal from the synchronizer (10), a level coder (15) for converting the buffered data into M-ary data, a multiplier (16) for multipling the output signal of the level coder (15) by the output signal from the delay circuit (13), and an amplifier (17) for amplifing the output signal from the multiplier (10) and then providing the amplified output signal to the sending line (L1). The receiver (C) comprises a delay circuit (18) for delaying the output signal of the waveform shaper (12) so that it corresponds to the specific number allocated the receiver (C), a correlator (19) for obtaining the correlation value between the signal on the receiving line (L2) and the output signal from the delay circuit (18), and an integrator (20) for integrating the output signal from the correlator (19) to provide the result to each of the corresponding subscriber units (6a, 6b, . . . , 6k).

As the synchronizer (10) of the common synchronization section (A), which is constructed as mentioned above, generates the synchronizing signal with the reference signal from the repeater (4) by using the input signals coming into the synchronizer (10), the code sequence, which is identical to the reference signal of the repreater (4), is produced at the code sequence generator (11). The code sequence signal is shaped at the waveform shaper (12) and then applied to the delay circuit (13) in the transmitter (B) and the delay circuit (14) in the receiver (C). The code sequence applied to the delay circuit (13) of the transmitter (B) is delayed by the time obtained by substracting the total delay time due to transmission through the lines (L1) and (L2) from the delay time corresponding to the specific number of the receiver (C), and then it is applied to the multiplier (16). At this time, the data to be transmitted are buffered in a buffer (14) and fetched in response to the synchronizing signal from the synchronizer (10), converted into M-ary data at the level coder (15) and then applied to the multiplier (16). Consequently, the code sequences signals delayed at the delay circuit (13) and the M-ary signal modulated at the level coder (15) are multiplied by the multiplier (16), amplified by the amplifier (17), and then transmitted to the sending line (L1).

As mentioned above, the data signals transmitted to the sending line (L1) are sent to the correlator (19) of the receiver (C) via the repeater (4) and the receiving line (L2). Further, at this time, the correlator (19) selects the correlation value from the code sequences delayed in such a manner that the value corresponds to the specific number assigned to the subscriber units of the receiver (C) in order for the circuit (13) to detect whether a signal is being sent to the subscriber unit of the receiver (C) among the signals sent by all other subscribers. If the signal sent to a certain subscriber does not exist, the correlator (19) does not produce its output signal. If the signal exists, the correlator (19) provides its output signal to an integrater (20). Subsequently, the signal sent is integrated and converted into the original data at the integrater (20) and then fed to the subscriber unit of receiver (C) among all the subscriber units (6a, 6b, . . . , 6k).

As described above, the present invention provides a network system in which all users can exchange information with each other without employing a centralization switchboard, and in which given transmission performance can be maintained satisfactorily. The invention provides a simple local area network system using a code division multiple method.

It is to be understood that the foregoing is illustrative of the invention and is in no way intended to limit the invention. Rather, the scope of the invention is to be determined by reference to the appended claim.

What is claimed is:

1. A code division multiple access local area network system comprising:

a repeater for generating a common synchronizing signal as a reference signal;

means for sending and receiving signals, said means for sending and receiving including a sending line and a receiving line for receiving data, each of said lines having an end connected to said repeater;

a plurality of subscriber units; and a corresponding plurality of transceivers connecting each of said subscriber units to said means for sending and receiving signals;

each of said transceivers including a common synchronizing circuit, a transmitter and a receiver, said common synchronizing circuit comprising means for replicating and regenerating a code sequence equal to said reference signal by synchronizing the code sequence in response to the reference signal of a maximal-length code sequence;

said transmitter comprising means for receiving said code sequence from said synchronizing circuit, means for delaying said code sequence according to a time determined by subtracting the entire time delay caused by said sending line and said receiving line from a delay time assigned to a specific receiver to which a signal is being sent, a level coder for converting data from said corresponding subscriber to M-ary data and providing an associated output signal, a multiplier connecting said level coder to said means for delaying said code sequence, for multiplying the delayed code from said means for delaying by said signal provided by said level coder to provide a multiplied signal, and an amplifier for amplifying said multiplied signal to provide an amplified signal, said transmitter transmitting said amplified signal to said sending line;

said receiver comprising means for receiving said code sequence from said synchronizing circuit, means for delaying said code sequence according to a delay time corresponding to a specific number assigned to said receiver, means for receiving data, a correlator for providing a correlation value of said code sequence delayed at said receiver and the received data, a detector for detecting signals for the receiver in accordance with the correlation value, and an integrator for integrating the detected signals, whereby signals can be transmitted from each of said subscriber units simultaneously without interference.

* * * * *